Nov. 3, 1942.   K. BERGER   2,300,865
TRANSMISSION MECHANISM
Filed July 22, 1940   2 Sheets-Sheet 1
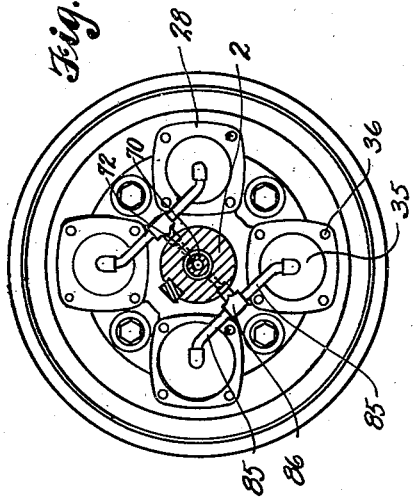
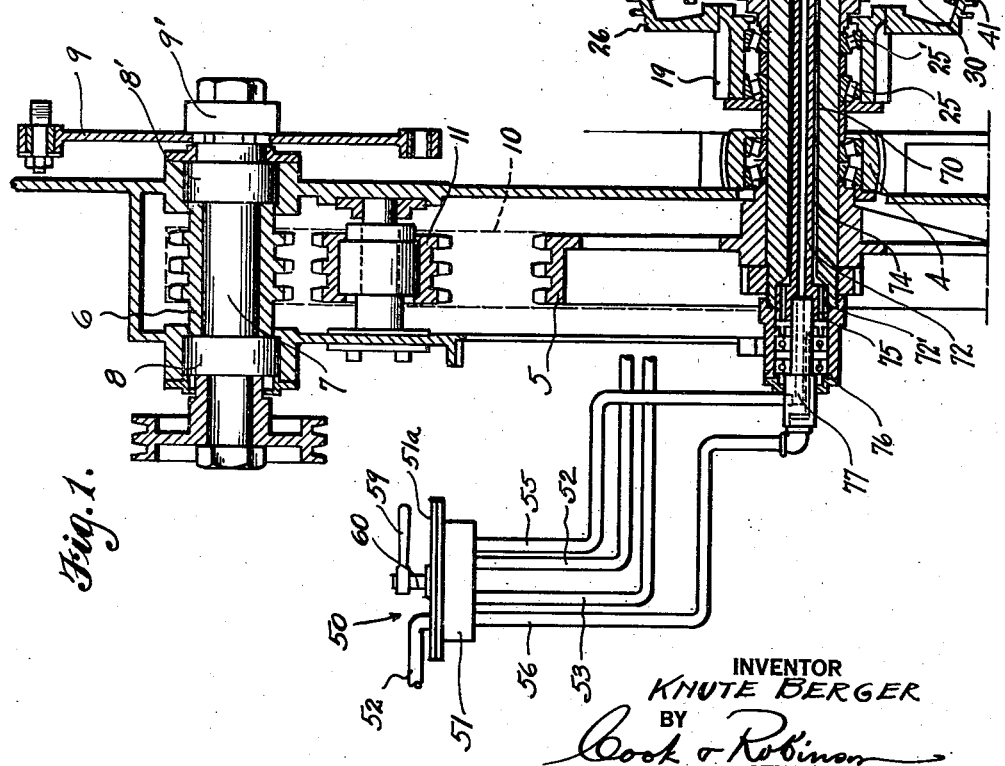
INVENTOR
*KNUTE BERGER*
BY
*Cook & Robinson*
ATTORNEY Nov. 3, 1942.  K. BERGER  2,300,865
TRANSMISSION MECHANISM
Filed July 22, 1940  2 Sheets-Sheet 2
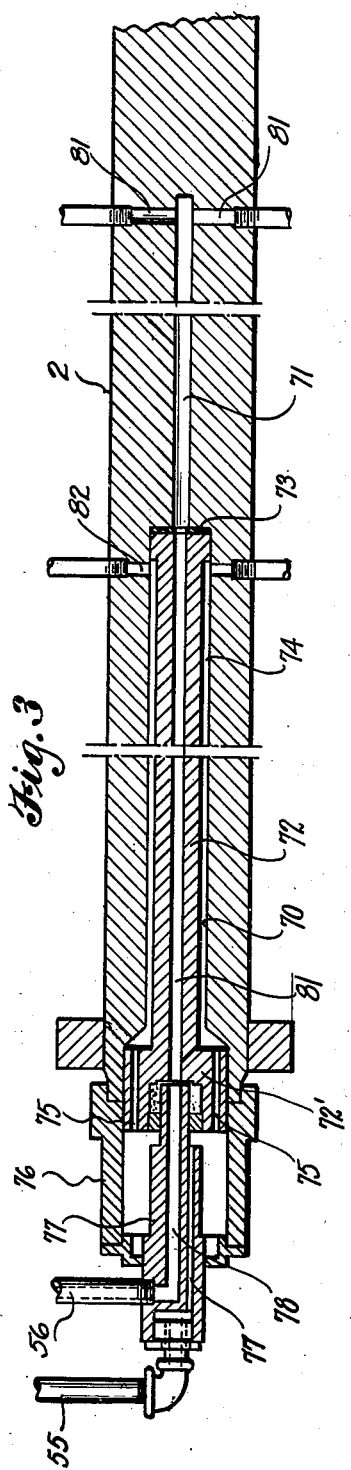
INVENTOR
KNUTE BERGER
BY
Cook & Robinson
ATTORNEY Patented Nov. 3, 1942

2,300,865

UNITED STATES PATENT OFFICE 2,300,865

TRANSMISSION MECHANISM

Knute Berger, Seattle, Wash.

Application July 22, 1940, Serial No. 346,841

2 Claims. (Cl. 192—85)

This invention relates to power transmission mechanism and has reference more particularly to a multiple speed drive for a power transmission shaft and clutch devices for the selective use of any one of the different speeds provided for.

More specifically stated, the present invention relates to power transmission mechanism wherein an engine driven shaft is equipped with a plurality of selectively engageable clutch devices, each designed, on being set, to effect a driving connection between a gear associated therewith on the said engine driven shaft and a gear that is keyed on a power transmission shaft; each of the different driving connections thus to be made, providing, through the selection of a particular set of gears, for driving the power transmission shaft at a speed different from that afforded by any other selection of gears.

It is the principal object of this invention to provide a power transmission mechanism of the kind above stated, embodying clutch mechanisms of novel construction and mode of operation, and adapted for actuation and control by a direct application of air under pressure; the air for all clutches being under control of a valve device whereby a selection of a particular clutch for effecting a desired driving speed may be made, or all clutches held in released position.

It is another object of this invention to provide an arrangement that adapts itself to use of any desired number of clutches on the same driven shaft, and whereby a corresponding number of different speeds for the transmission shaft may be made available through the individual use of the clutches.

A still further object of the invention resides in the novelty of the specific details of construction of parts comprised in any one of the clutches, and in the means for and mode of applying the controlling air thereto.

Still further objects of the invention reside in the details of construction and combination of parts, making up the transmission mechanism, and in their mode of operation, as will hereinafter be fully described.

In accomplishing these and other objects of the invention, I have provided the improved details of construction, the preferred forms of which are illustrated in the accompanying drawings, wherein—

Fig. 1 is a sectional detail particularly illustrating the details of construction of a clutch and its air connection with the control valve.

Fig. 2 is a cross sectional view taken on line 2—2 in Fig. 1.

Fig. 3 is an enlarged sectional detail, showing the means for connection of the air distributing pipes with one end of the transmission shaft, and with the clutches controlled from that end of the shaft.

Fig. 4 is an axial section of the air control valve.

Fig. 5 is a horizontal section of the valve on line 5—5 in Fig. 4.

Fig. 6 is a plan view of the piston carrier disk associated with a clutch mechanism.

Fig. 7 is a cross section on line 7—7 in Fig. 6.

Fig. 8 is a plan view of one of the cylinder forming castings for the clutch.

Fig. 9 is a cross section on line 9—9 in Fig. 8.

In the drawings, 2 designates a transverse shaft, rotatably supported by a bearing 4, carried in a frame construction. The shaft 2 is equipped at one end with a driving sprocket wheel 5 that is alined with a smaller sprocket wheel 6 keyed on a drive shaft 7. The shaft 7, Fig. 1, is revolubly contained in spaced bearings 8 and 8', which also are carried in the frame structure, and one end of this shaft mounts a nut 9' which, in turn, interlocks with and mounts a driving disk 9, which is designed to be bolted to the fly wheel of an engine, not here shown, to provide for a direct drive of the shaft 7 by the engine.

It may be explained, however, that the shaft 7 might be driven by any suitable means such as clutch connection or that the shaft 2 might be driven by a direct connection with any prime mover.

A chain belt 10 extends about the sprocket wheels 5 and 6, and this completes a driving connection between the drive shaft 7 and the shaft 2. An idler sprocket 11 has been illustrated for belt tensioning purposes.

Revolubly mounted on shaft 2, in spaced relationship therealong, are gear wheels 19 and 21; each mounted by two sets of roller bearings 25—25', as has been indicated in connection with gear 19, and fixed to each gear at one end thereof, and coaxial of the shaft, is an internal friction cone 26. Adjacent each gear and within each friction cone associated therewith a hub 27 is keyed on the shaft, and this hub is integrally cast with an encircling flange 27a and a plurality of short cylinders 28, which in the illustration are shown to be four in number, but may be two, three, four or six, arranged at equal spacing about the hub axis, and with their axes parallel to the shaft 2. This cylinder equipped disk is best illustrated in Figs. 8 and 9.

Slidably fitted about the inner end portion of the hub 27 and adapted for adjustment in its axial direction, is a disk 30, cast with four pistons 31 thereon which it respectively in the four cylinders 28. This disk 30, as noted in Fig. 1, is located between the inner ends of the cylinders and the base of the friction cone 26, and it mounts thereon, coaxial of the cone 26, an external friction cone 32 which is equipped with friction linings 33 adapted to engage the cone 26 to complete a driving connection between shaft 2 and the gear wheel; it being understood that the two friction cones 26 and 32 are carried respectively by the gear 19 and the disk 30, and that the latter has driving connection with shaft 2 by reason of its pistons being carried in the cylinders that are integral with the hub 27, which is keyed on the shaft 2. This general arrangement is common to all the clutch units used.

Each cylinder in a clutch assembly is closed at its outer end by a plate or head 35, secured by bolts 36, and each piston is equipped at its end with a packing washer 37 held in place thereon by a clamp plate 38 secured to the piston end by a bolt 39.

In each of the clutch devices used in the present arrangement, the clutch cone 32 is adapted to be yieldably held disengaged from its coacting friction cone 26; this being effected by use of a plurality of coiled springs 40 confined in spring cages 41 that are fixedly mounted on the disk 27a between the cylinders. The springs are arranged to act against nuts 32 threaded onto the outer ends of bolts 43 that extend through the base of the cages and which are anchored at their inner ends in the piston carrying disk 30. The several springs 40, thus associated with each clutch, yieldingly retain the pistons at their inner limits with respect to their position in their corresponding cylinders, and in so doing, hold the disk 30 at such position that the friction cone 32 will be held free of the cone 26.

The shifting of the clutch cone 32 of any clutch unit, into driving contact with the corresponding cone 26 is effected by an application of fluid or air under pressure into its cylinders 28. Air or fluid is supplied to the individual clutch devices through passages provided in the shaft 2, under control of a valve device designated generally by reference numeral 50. This device may be any of the conventional types of valves, suitable for the purpose, but, as here shown, comprises a valve housing 51, having an air supply pipe 52 opening thereinto through the top plate 51a, and having four distributing pipes 53, 54, 55 and 56 leading from the bottom of the chamber, at equal spacing about the center. A rotary valve plate 58 is fitted in the housing and is rotatably adjustable by means of a hand lever 59 attached to valve stem 60. The valve plate 58 has a passage 61 therethrough for effecting a selective connection between the inlet pipe and any one of the four distributing pipes, and also has a bottom recess 62 which provides connection between an exhaust port 63 in the housing and all distributing pipes except the one in connection with the air supply at any time.

Two of the distributing pipes, here shown to be pipes 55 and 56, lead to one end of the shaft 2, and the other two are intended to lead to the other end, there to be connected with passages provided in the shaft, and individually leading to other clutch devices.

Referring now to Figs. 1 and 3, it will be seen that the shaft 2 has an axial bore 70 of one diameter extending from the end of the shaft to the location of the first clutch device, and has a continuing bore 71 of a lesser diameter extending to the location of the second clutch device. A tubular shaft 72 is fitted in the bore 70, and is air-sealed at its inner end against the shoulder 73 at the inner end of the bore 70, and, at its outer end, has an enlarged head portion 72', air sealed in an enlarged outer end portion of bore 70. The shaft 72 is of lesser diameter than the bore 70 and thus there is an air passage 74 provided about it, extending the length of bore 70. Small holes 75 through the head 72' communicate with the passage 74. A cap 76 is applied to the outer end of shaft 2 and rotatably contains therein a nipple 77. The nipple extends beyond cap 76 and is bored for connection therewith of the air distributing pipes 55 and 56. Passages 78 and 79 in the nipple respectively provide direct air connection to the longitudinal air channel 81 of the tubular shaft 72 and to the passage 74 provided by the bore 70 about the shaft 72.

At its inner end, the passage 81 in shaft 72 connects with the bore 71 and through this and lateral bores 81 at the inner end of bore 71, air is supplied for controlling the second clutch device C. Lateral bores 82 leading to the side of shaft 2 from the inner end of bore 70 provide for delivery of air to the first clutch device on the shaft.

The delivery of air to the several clutch cylinders is made through the pipe connections as best noted in Figs. 1 and 2, wherein it will be observed that each two adjacent cylinders have pipe connections 85 with an intermediate T-fitting 86, which, in turn, has connection with a lateral bore from the bore 70 in shaft 2. Thus all cylinders of the first clutch assembly are connected through the bore 70, ports 75, channel 79 and pipe 56 with the source of air supply under control of valve 50. Likewise, all cylinders of the second clutch assembly are connected through bore 71, tube 72, channel 78 and pipe 55 with the source of compressed air under control of the valve device 50. Air is both admitted to and exhausted from the cylinders through these connections.

The operation of the transmission is as follows:

Assuming that the shaft 2 is being driven through connection with an engine, or other prime mover, at a uniform speed and that both clutch devices are disengaged, it will be understood that no power will then be transmitted to the gears 19 and 21. Should it be desired to apply driving power to the gear 19, for example, the operator adjusts the valve 50 to admit air pressure to set the clutch corresponding to a gear 19. Upon making the adjustment of the valve 50 that connects the source of air under pressure to the distributing pipes, for example pipe 56, that supplies the first clutch, air will be applied through that pipe and through the several channels 79, 75, 74 and 81, then through the pipe connections to the outer ends of the four cylinders of the clutch. This air pressure forces the pistons and disk 30 inwardly, thereby engaging the internal friction cone 32 with the external friction cone 26, thereby to lock the gear 19 on the shaft 2 and effect rotation of shaft 12 at a definite speed, as provided by the ratio of gears 15 and 19.

The present device has proven to be very desirable in logging operations, where the shaft 12 is equipped for the driving of a cable winding drum, such, for example, as by direct gear connection with gear 15.

However, it is not the intent that the device be confined to any specific use, but that the claims shall be given an interpretation commensurate with the scope of the invention disclosed and which resides in the provision of the plurality of clutches on the driven shaft, selectively operable for the transmission of power to the transmission shaft, to drive the latter at different speeds.

Having thus described my invention, what I claim as new therein and desire to secure by Letters Patent is:

1. In a power transmission mechanism, a drive shaft, a wheel revoluble thereon and equipped with a clutch element, a hub fixed on the shaft adjacent the wheel, a plurality of cylinders mounted thereby about and parallel with the shaft, a piston plate formed with a central hub bearing that is slidable on and fitted to the said hub, a clutch element on the plate to coact with the clutch element on the wheel to drive the latter, means normally yieldingly holding the plate in position for disengagement of the clutch elements, pistons integral with the said plate fitted in the cylinders; said shaft having longitudinal channel therein, distributing conduits from said channel to the cylinders, and means for controlling the application of a pressure medium to the channel for actuation of the pistons and control of the clutch.

2. In a power transmitting mechanism, a revoluble drive shaft, a gear wheel revolubly mounted thereon, a clutch element fixed to the wheel coaxial of the shaft, a hub fixed on the shaft adjacent the gear wheel and having an integral encircling flange and a plurality of cylinders integral with the flange, and axially parallel with and equally spaced about the shaft, open at the ends adjacent the gear wheel and closed at their other ends, a piston plate having a central hub slidably fitted on the first mentioned hub between the wheel and said hub flange, for movement of the plate toward and from the gear wheel, a clutch element on the said plate adapted to coact with the clutch element first mentioned to drive the gear wheel, pistons integral with the plate and extended into the cylinders at their open ends; said hub flange having openings therein between the cylinders; said piston plate having studs mounted therein and extended through the flange openings, springs acting against the studs and flange to urge the clutch elements apart; said shaft having an axial channel and outlets therefrom, pipes from said outlets into the cylinders at their closed ends, and means for controlling the application of pressure medium to the shaft channel for control of the clutch elements.

KNUTE BERGER.